Jan. 18, 1966 R. P. MASSEY 3,230,476

TRANSISTOR INVERTER

Filed Dec. 29, 1961

INVENTOR
R. P. MASSEY
BY R. B. Ardis

ATTORNEY

United States Patent Office 3,230,476

Patented Jan. 18, 1966

3,230,476
TRANSISTOR INVERTER

Richard P. Massey, Westfield, N.J., assignor to Bell Telephone Laboratories, Incorporated, New York, N.Y., a corporation of New York Filed Dec. 29, 1961, Ser. No. 163,217
7 Claims. (Cl. 331—113)

This invention relates to a system for converting direct current to alternating current and more particularly to a transistor oscillator inverter circuit.

In many electrical and electronic systems it is important to employ power systems which amplify direct current and supply it at a constant magnitude to a given load. Such power supply systems must possess an extremely high degree of reliability with a relatively high order of absolute current stabilization. Power supply systems of the transistor inverter type are small, light, efficient and require no maintenance, possess the required degree of reliability and stability and, therefore, qualify for broad application.

An inverter circuit generally employs a plurality of transistors and a saturable switching and power transformer for converting direct current to alternating current which, in turn, may be rectified. The transistors function as automatic switches, i.e., conductive or nonconductive, to complete circuits for supplying current from a direct-current source to a portion of a transformer winding alternately in opposite directions. Each circuit is usually completed through one or more transistor switches in series with the direct-current supply source with either current or voltage feedback employed to control the switching time of the transistors. Several switches in series are employed because of the maximum inverse potential limitations of the transistors, i.e., several transistors in series are required to share the inverse potentials. These inverse potentials are due to the collapsing flux in the switching and power transformers which, in turn, induce inverse voltages that are reflected across the base-emitter and collector-emitter junctions of the nonconducting transistors. Under these conditions, there is a high probability of thyratron-like behavior of the transistor characteristics due to localized heating of the junction (called pinch-in effect) which may result in a collector-emitter short.

The energy stored in the saturable switching and power transformer additionally results in electrical interference, transient voltage spikes, temperature instability and reduced transistor switching speed. The switching speed limitations restrict the upper frequency of oscillation which, in turn, somewhat impairs the inversion efficiency of the over-all configuration and requires extra filtering. In an effort to eliminate the saturable transformer, the prior art has taught configurations wherein transistor saturation rather than transformer saturation is used to control the switching speed. These circuits, however, have relatively longer switching times because of the storage time required for the consumption of the exces minority carriers in the transistors. A related disadvantage is the spike of excess current through each of the transistors during the "turning-on" and "turning-off" intervals of the transistor.

In addition, the voltage feedback circuits of the prior art also have the serious disadvantage of temperature and random base-emitter variation sensitivity. To eliminate these disadvantages, the prior art employed current feed-back which requires the use of an auxiliary transformer with multiple output windings which, in turn, results in a higher per unit cost and gives rise to serious circuit instability problems.

The inverter circuits of the prior art are frequently employed as square wave oscillators. Such circuits were thought to be limited to a square wave output with a sine wave output obtainable only through feeding the square wave output into an elaborate and expensive sine wave approximating network. This limitation has led to limited usage of inverter circuits as oscillators.

It is, therefore, an object of this invention to provide an efficient, reliable, stable, relatively low cost sine and square wave oscillator-inverter circuit with optimum high frequency switching capabilities.

Briefly, the present invention employs a nonlinear network for switching control. Since the power transformer is no longer required for switching control, transformer miniaturization and impedance matching for optimum power transfer between the transistor and load circuits are possible. The base drive of the conducting transistor switch is decreased in a nonlinear manner to facilitate high speed transistor switching which, in combination with a saturable transformer operated in the nonsaturable region, eliminates the adverse effects due to transformer energy storage. The inverse voltage appearing across the non-conducting transistor is limited to the forward voltage drop (a few tenths of a volt) of a diode poled to conduct only during the transistor nonconduction interval. Since the nonconducting transistor is not driven deeply into cut-off it can be biased into conduction rapidly which, in turn, also facilitates high speed transistor switching. In one embodiment of the invention, either a sine wave or square wave output may be obtained by merely interchanging the "phasing" of a feedback winding.

Other objects and features of the present invention will become apparent upon consideration of the following detailed description when taken in connection with the accompanying drawing in which.

It should be noted that the first digit of each component designation corresponds to the figure-number wherein that component made its first appearance.

Figure 1:
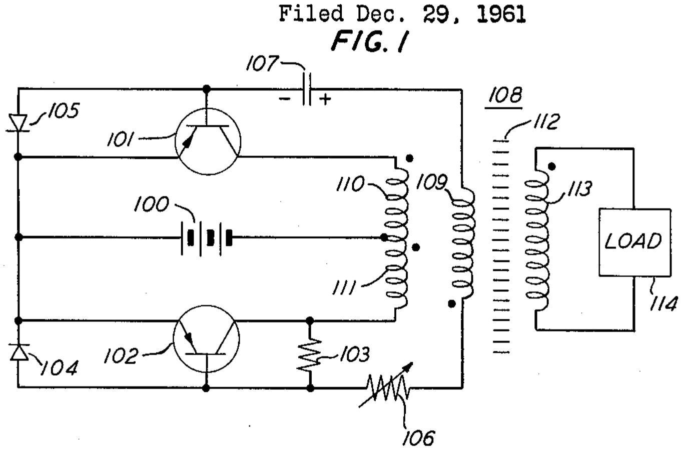
FIG. 1 is a schematic representation of one embodiment of the invention.

FIG. 1 of the drawings represents one embodiment of the invention which comprises pnp transistors 101 and 102, a direct-current input voltage source 100, a load 114, diodes 104 and 105, a nonlinear switching control network comprising a resistor 106 and a capacitor 107, a transformer 108 having a saturable core 112 and a primary winding comprising portions 110 and 111 as well as a feedback winding 109 and a secondary winding 113. Resistor 103 is a starting resistor.

The emitter electrodes of transistors 101 and 102 are connected to one terminal of the direct-current input source 100. Winding portion 110 is connected between the other terminal of the direct-current input source 100 and the collector electrode of transistor 101, while winding portion 111 is connected between the same terminal of the direct-current input source 100 and the collector electrode of transistor 102. Diodes 104 and 105 are connected across the base-emitter electrodes of transistors 102 and 101, respectively. Adjustable resistor 106, feedback winding 109 and capacitor 107 are serially connected between the base electrodes of transistors 101 and 102. Starting resistor 103 is connected across the base and collector electrodes of transistor 102. The load 114 is connected to the secondary winding 113.

Since the dot convention is referred to frequently in the following description, it is defined at this point. Briefly, the dot convention refers to a means whereby the polarity of a voltage induced in a winding can be ascertained at any instant in the cycle of operation. For purposes of this description whenever a dot appears in relation to a winding, the polarity of the voltage induced in that winding has the same polarity as the voltage induced at the dot of every winding in the same magnetic field.

The principles of the present invention can best be understood from the operation of the circuit of FIG. 1 which is as follows: At the instant the direct-current supply source 100 is applied to the circuit, a starting current path through the base-emitter path of transistor 102, starting resistor 103, winding portion 111 and back to the direct-current source 100 is established. The base-emitter current flow through transistor 102 biases it into conduction such that current flows from the direct-current supply source 100 through the emitter-collector path of transistor 102, through winding portion 111 and back to the direct-current supply source 100. As can be seen from the dot convention, the voltage induced in feedback winding 109 is negative at the dot, hence biasing transistor 102 further into conduction which, in turn, results in more current through the emitter-collector path of transistor 102. Capacitor 107 charges to the polarity shown on the drawing through the loop comprising feedback winding 109, resistor 106, the base-emitter path of transistor 102, and diode 105. As time goes on, capacitor 107 exponentially charges to a sufficient potential such that the base-current drive of transistor 102 falls to a negligible value which, in turn, causes transistor 102 to stop conducting. It should be noted that the nonlinear (exponential) switching control employed causes the transistor base current drive to fall off exponentially so that the conducting transistor is driven into cut-off gradually rather than abruptly (as taught by the prior art) which, in turn, makes high switching speeds possible. Resistor 106 controls the charge time of capacitor 107 and hence the switching frequency of the inverter. Since the nonlinear control network is in the low power feedback path rather than the main power path, losses are reduced to a minimal value, thus obtaining optimum efficiency.

Returning to the operation of the circuit of FIG. 1, the collapsing flux in transformer 108 induces a potential in feedback winding 109 such as to drive transistor 102 further into cut-off and to bias transistor 101 into conduction as can be seen from the dot convention. Induced current now flows through winding 109, through resistor 106, through diode 104, and the base-emitter path of transistor 101. It should be noted that the current flow through elements 106 and 109 is in a direction opposite to the original (transistor 102 conducting) direction. Current in the base-emitter path of transistor 101 causes current to flow from the direct-current source 100, through the emitter-collector path of transistor 101, through winding portion 110, and back to the direct-current source 100. As can be seen from the dot convention, the potential induced in the feedback winding 109 is now such as to drive transistor 101 further into conduction and transistor 102 further into cut-off. Capacitor 107 now discharges its stored potential and charges to a potential of the opposite polarity to that shown on the drawing, through the path comprising feedback winding 109, resistor 106, diode 104 and the emitter-base path of transistor 101. It should be noted that the conducting diode on alternate half cycles is associated with the nonconducting transistor. The voltage drop across the base-emitter electrodes of the nonconducting transistor is, therefore, limited to the forward voltage drop across the conducting diode which is in the neighborhood of a few tenths of a volt. Since the transistors of the inventiton are not driven deeply into cut-off, they are easily and quickly switched from cut-off to conduction which in combination with the nonlinear switching control from conduction to cut-off makes possible optimum high frequency switching rates. As discussed in connection with transistor 102, capacitor 107 will charge exponentially until the base drive of transistor 101 becomes insufficient to maintain the conduction of transistor 101. The flux in transformer 108 now collapses and biases transistor 102 into conduction. The cycle then continually repeats itself until the direct-current source 100 is removed from the circuit.

Transformer 108 has a saturable core 112 rather than the conventional nonsaturable core to reduce the energy stored in the transformer to a minimal value thereby minimizing electrical interference, voltage transient spikes and transistor switching times. The transformer 108 is operated in the nonsaturable (linear) portion of the BH characteristic. Since the switching frequency is no longer a function of the transformer construction, the turns ratio may be varied for impedance matching, hence maximum power transfer. Additionally, the present invention eliminates the need for base-emitter inverse voltage sharing series strings of transistors in inverter configurations. It should be obvious, however, that a nonsaturable transformer could be employed although the circuit performance would be somewhat impaired.

In the voltage feedback configuration of FIG. 1, since both the frequency of oscillation increases as load current increases and the peak value of the exponential base current is substantially independent of load impedance, the average base current increases as the load resistance decreases or load current increases. This characteristic (transistor drive proportional to the load current) is a basic property of current feedback circuits and provides for automatic compensation for temperature caused and random base-emitter variations. The use of multiple output windings on transformer 108 is facilitated since the average base current is increased as the total load current increases up to the overload point. It should be noted that this advantage is obtained without the use of either a multiple output auxiliary power transformer or a multiple output current feedback transformer in the primary circuit of the power transformer. The latter gives rise to serious instability. It should be additionally noted that frequency regulation is possible by increasing the number of turns of winding 109 with respect to winding portions 110 and 111. In such a configuration the output frequency would be independent of the input voltage.

Figure 2:
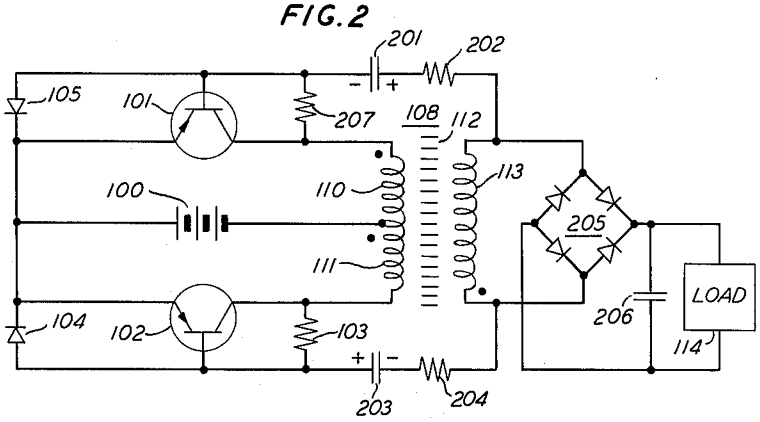
FIG. 2 represents a second embodiment of the invention wherein direct-current isolation is obtained without the use of a transformer winding.

FIG. 2 of the drawing is an alternate embodiment of the invention. Two RC networks 201, 202 and 203, 204 are employed for frequency control while the feedback winding of transformer 108 is eliminated. In a preferred embodiment, resistors 202 and 204 would be approximately half the value of resistor 106 while capacitors 201 and 203 would be approximately twice the value of capacitor 107. Resistor 207 is a starting resistor. A full wave rectifier 205 is connected to the secondary winding 113 of transformer 108 and a filter capacitor 206 is connected across the load. Low voltage D.C. to higher voltage D.C. conversion is thus possible. As can be seen from the component designations, the remaining components of FIG. 2 are the same as discussed in connection with FIG. 1. It should be noted that direct-current isolation is obtained in the circuit of FIG. 2, without the use of an additional feedback winding, by the use of the two RC switching control networks. Since the feedback winding is not required, a filament (current) transformer may be employed in this configuration for low power outputs. The use of such a transformer, which is relatively inexpensive, results in substantial cost per unit savings.

The operation of the circuit of FIG. 2 is as follows: At the instant the direct-current source 100 is applied to the circuit, current flows from the direct-current source 100 in two paths. The first comprises the emitter-base path of transistor 101, starting resistor 207, primary winding portion 110 and back to the direct-current source 100.

The second path comprises the emitter base path of transistor 102, starting resistor 103, primary winding portion 111 and back to the direct-current input source 100. Although transistors 101 and 102 are of the same conductivity type, the current gain of one of these transistors will be higher than the current gain of the other. The transistor with the higher current gain will be faster acting, i.e., the current in the emitter-collector path will increase at a faster rate which, as discussed in connection with FIG. 1, is all that is necessary to start the inverter's push-pull mode of operation. The use of dual starting resistors (103 and 207) insures the starting capability of the circuit. Assuming that transistor 102 is biased into conduction, transistor 101 will be driven into cut-off in the manner described in connection with FIG. 1. Current flows through the base-emitter path of transistor 102, through the RC network comprising capacitor 203 and resistor 204, through winding 113, through the RC network comprising resistor 202 and capacitor 201 and through diode 105. Capacitors 201 and 203 charge to the polarities noted in FIG. 2. As discussed in connection with FIG. 1 when the exponential charging current reaches a value such that the base drive of transistor 102 falls to a value insufficient to maintain conduction of transistor 102, the flux in transformer 108 collapses and biases transistor 101 into conduction. Current now flows through the base-emitter path of transistor 101, capacitor 201, resistor 202, winding 113, resistor 204, capacitor 203 and diode 104. Capacitors 201 and 203 thus discharge and charge to a potential of the opposite polarity. Subsequently, the exponential base drive of transistor 101 becomes insufficient to maintain conduction of transistor 101 and the flux of transformer 108 collapses and biases transistor 102 into conduction. The cycle then continually repeats itself until the direct-current source 100 is removed. It should be noted that, as in FIG. 1, the reverse voltage appearing across the base-emitter electrodes of transistors 101 and 102 is limited to the forward voltage drop of diodes 105 and 104, respectively.

Figure 3:
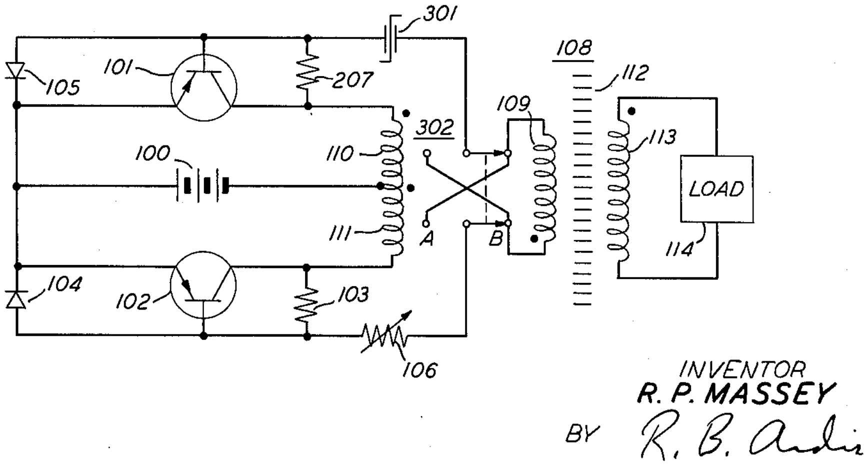
FIG. 3 represents a third embodiment of the invention wherein either a sine or square wave output may be obtained.

The capacitor 107 of FIG. 1 may be replaced by a nonlinear capacitor 301 as shown in FIG. 3. Capacitor 301 of FIG. 3 in a preferred embodiment would be a ferroelectric crystal of barium titanate or guanadine aluminum sulfate hexahydrate (GASH) with a rectangular hysteresis loop (charge v. voltage). The circuit parameters can be adjusted such that capacitor 301 saturates before the saturable transformer 108, thereby determining the frequency of operation. The double-pole, double-throw switch 302 determines whether the output waveform will be a square wave or a sine wave as discussed hereinafter. As can be seen from the component designations, each of the other components of FIG. 3 is discussed in connection with the FIGS. 1 and 2 and is, therefore, not discussed further at this time.

In the manner discussed in connection with the starting circuits comprising resistors 103 and 207 in FIG. 2, assume transistor 102 is biased into conduction, and that switch 302 is in the B position. Current will now flow through the emitter-base path of transistor 102, resistor 106, winding 109, ferroelectric capacitor 301 and diode 105, thus causing more emitter-collector current flow through transistor 102 which, in turn, induces a large voltage in winding 109 to drive transistor 102 further into conduction and ultimately into saturation. Transistor 102 continues in saturation until ferroelectric capacitor 301 saturates which, in turn, causes the base-emitter current of transistor 102 to fall to zero. Since there is no longer any base drive for transistor 102, the current in the emitter-collector path falls to zero causing the flux in transformer 108 to collapse which thereby biases transistor 101 into conduction, as discussed in connection with FIG. 1. Transistor 101 conducts until the ferroelectric capacitor 301 again saturates (at the opposite end of the square hysteresis loop) driving transistor 101 into cut-off and transistor 102 into conduction. As before, the cycle continually repeats itself until the direct-current input source 100 is removed. The inverse base-emitter voltages appearing across transistors 101 and 102 are again limited to the forward voltage drop across diodes 105 and 104, respectively.

It has been found experimentally that if switch 302 is in position A, a pure sine wave (less than two percent distortion) output is obtained. It should be noted that the phasing of winding 109 is now opposite that of the square wave output obtained when switch 302 is in position B. It is possible, therefore, to obtain either a sine or square wave output merely by changing the position of switch 302.

Although FIGS. 1 to 3 only show embodiments of the invention wherein pnp transistors are employed, it should be understood that with appropriate component polarization changes, npn transistors or the combination of npn and pnp transistors may be used equally as effectively. Additionally, FIGS. 1 to 3 only illustrate the common emitter embodiments of the invention for the sake of brevity. It should be obvious that common collector and base configurations may also be used. It should also be obvious that the nonlinear network of FIGS. 1 to 3 may be any such nonlinear network and is not restricted to RC configurations.

Since changes may be made in the above-described arrangement and different embodiments may be devised by those skilled in the art without departing from the spirit and scope of the invention, it is to be understood that the matter contained in the foregoing description and accompanying drawings is illustrative of the application of the principles of the invention and is not to be construed in a limiting sense.

What is claimed is:

1. A transistor oscillator comprising a transistor having first, second and control electrodes, a source of potential, an inductance device having a plurality of windings, ferroelectric crystal means, feedback means, means for serially connecting said source of potential, said first and second electrodes and at least a portion of one of said plurality of windings, means for serially connecting said control electrode, said crystal means, another of said plurality of windings, said feedback means and the first electrode of said transistor.

2. A transistor oscillator comprising first and second transistors each having first, second and control electrodes, an inductance device having a plurality of windings, a source of direct-current potential, capacitive means having a square hysteresis loop, means for serially connecting said source of direct-current potential, the first and second electrodes of said first transistor and at least a portion of one of said plurality of windings, means for serially connecting said direct-current source, the first and second electrodes of said second transistor and the remaining portion of said one of said plurality of windings, first and second feedback means, means for serially connecting the control electrode of said first transistor, said capacitive means, another of said plurality of windings, said first feedback means and the first electrode of said first transistor, and means for serially connecting the control electrode of said second transistor, said other of said other plurality of windings, said capacitive means, said second feedback means and the first electrode of said second transistor.

3. An oscillator in accordance with claim 2 wherein each of said first and second feedback means comprises an individual asymmetrically conducting device.

4. An inverter circuit comprising first and second transistors each having base, collector and emitter electrodes, a transformer having first, second and third windings and a saturable core, a source of potential, a ferroelectric capacitor, first and second asymmetrically conducting devices, first and second starting means, an adjustable resistor, a load, a double-pole, double-throw switch having input terminals and first and second sets of output terminals, means for serially connecting said input source of direct-current potential, the emitter and collector electrodes of said first transistor and at least a portion of said first winding, means for serially connecting said direct-current source, the emitter and collector electrodes of said second transistor and the remaining portion of said first winding, means for serially connecting the base electrode of said first transistor, said ferroelectric capacitor, the input terminals of said double-pole, double-throw switch, said resistor and the base electrode of said second transistor, means for connecting one of said set of output terminals of said double-pole, double-throw switch to both said second winding and said other set of output terminals, means for connecting said load to said third winding, means for connecting said first asymmetrically conducting device across the base-emitter electrodes of said first transistor, means for connecting said first starting means across the base-collector electrodes of said first transistor, means for connecting said second asymmetrically conducting device across the base-emitter electrodes of said second transistor, and means for connecting said second starting means across the base-collector electrodes of said second transistor.

5. An inverter circuit comprising a transistor having base, collector and emitter electrodes, a transformer having primary and secondary windings, a source of direct-current potential, a load, nonlinear frequency control means, means serially connecting said source of direct-current potential, the collector and emitter electrodes of said transistor and at least a portion of said primary winding, a diode poled to conduct in the direction of forward emitter current flow of said transistor, means connecting said load across said secondary winding, and means serially connecting the base electrode of said transistor, said nonlinear control means, said load, said diode and the emitter electrode of said transistor, whereby feedback energy is directly transmitted from said load to the base and emitter electrodes of said transistor in a nonlinear manner.

6. An inverter circuit in accordance with claim 5 wherein said nonlinear circuit includes a serially connected resistor and a capacitor.

7. An inverter circuit comprising first and second transistors each having base, collector and emitter electrodes, a source of input potential, a transformer having primary and secondary windings, a load, means serially connecting the collector and emitter electrodes of said first transistor, said source of input potential and at least a portion of said primary winding, means serially connecting the collector and emitter electrodes of said second transistor, said source of input potential and the remaining portion of said primary winding, first and second diodes, means connecting said first diode across the base and emitter electrodes of said first transistor, said first diode being poled to conduct in the direction of forward emitter current flow of said second transistor, means connecting said second diode across the base and emitter electrodes of said second transistor, said second diode being poled to conduct in the direction of forward emitter current flow of said first transistor, means connecting said load across said secondary winding, first and second nonlinear networks, and means serially connecting the base electrode of said first transistor, said first nonlinear network, said load, said second nonlinear network and the base electrode of said second transistor, whereby direct-current isolation is obtained and feedback energy is directly transmitted from said output circuit to said input circuit in a nonlinear manner.

References Cited by the Examiner

UNITED STATES PATENTS

| | | | |
|---|---|---|---|
| 2,915,710 | 12/1959 | Schiewe et al. | 321—2 |
| 2,965,856 | 12/1960 | Roesel | 321—2 X |
| 2,971,126 | 2/1961 | Schultz | 331—113.1 X |
| 2,977,550 | 3/1961 | Roesel et al. | 321—2 X |
| 3,030,589 | 4/1962 | Kadri | 331—114 |
| 3,034,073 | 5/1962 | Newell et al. | 331—114 |

LLOYD McCOLLUM, *Primary Examiner.*